June 23, 1964 D. W. ACKERMAN ETAL 3,138,239
PROCESS LINE CONVEYOR BELT
Filed Aug. 7, 1962 5 Sheets-Sheet 1
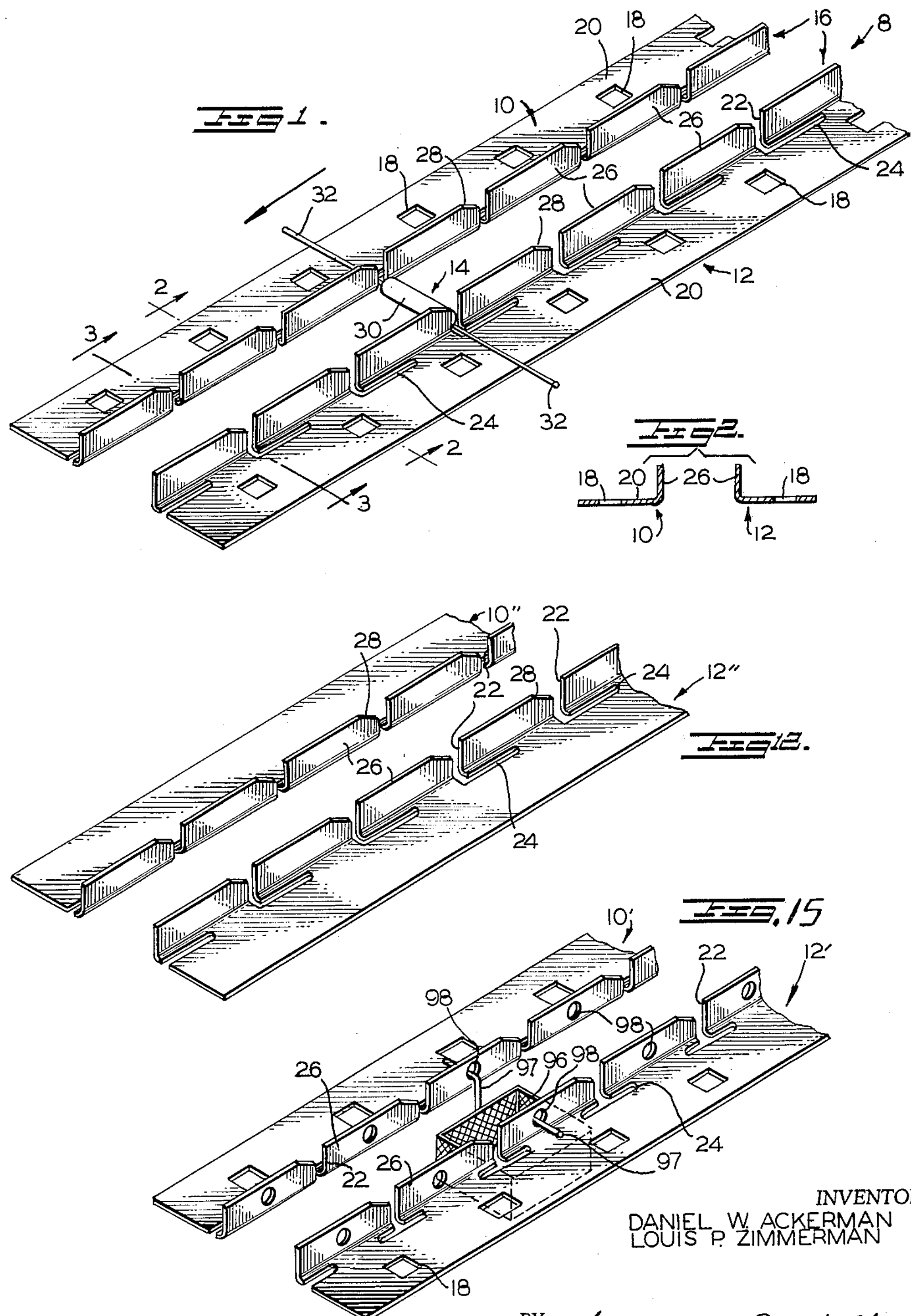
INVENTORS
DANIEL W. ACKERMAN
LOUIS P. ZIMMERMAN
BY Franklin D. Wolffe
ATTORNEY

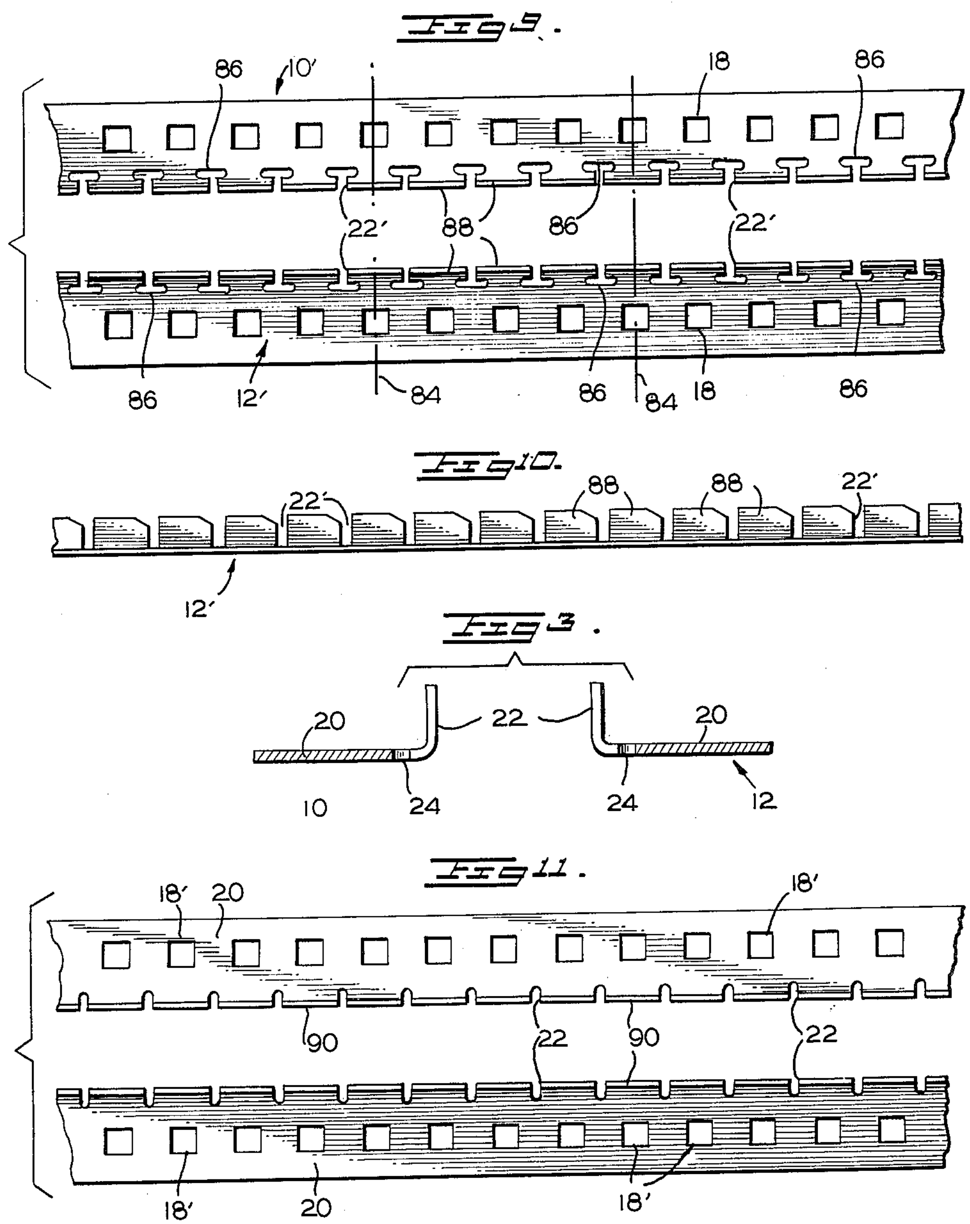
INVENTORS
DANIEL W. ACKERMAN
LOUIS P. ZIMMERMAN
BY Franklin D. Wolffe
ATTORNEY PROCESS LINE CONVEYOR BELT
Filed Aug. 7, 1962 5 Sheets-Sheet 3
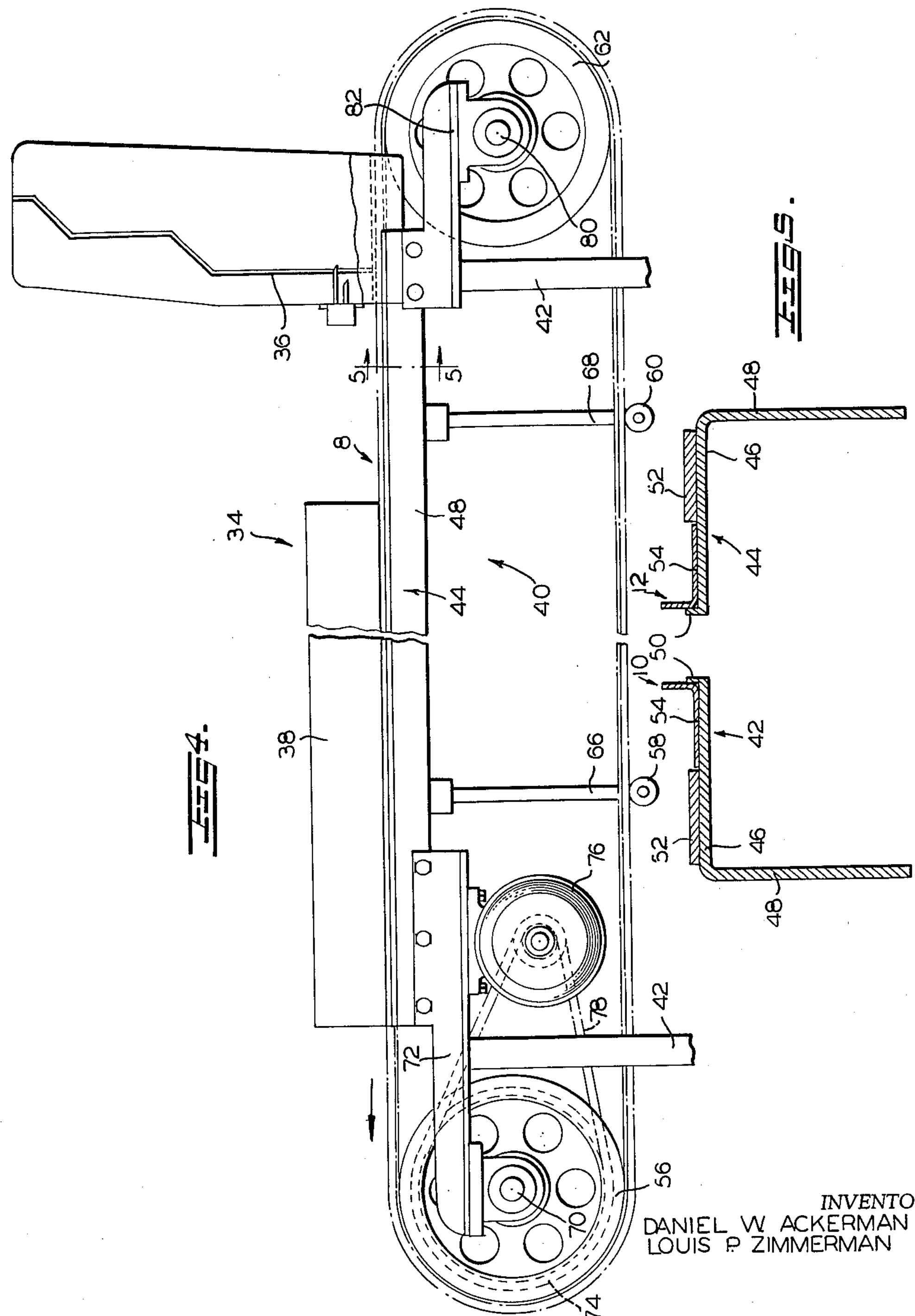
INVENTOR
DANIEL W. ACKERMAN
LOUIS P. ZIMMERMAN
BY *Franklin D. Wolffe*
ATTORNEY PROCESS LINE CONVEYOR BELT
Filed Aug. 7, 1962 5 Sheets-Sheet 4
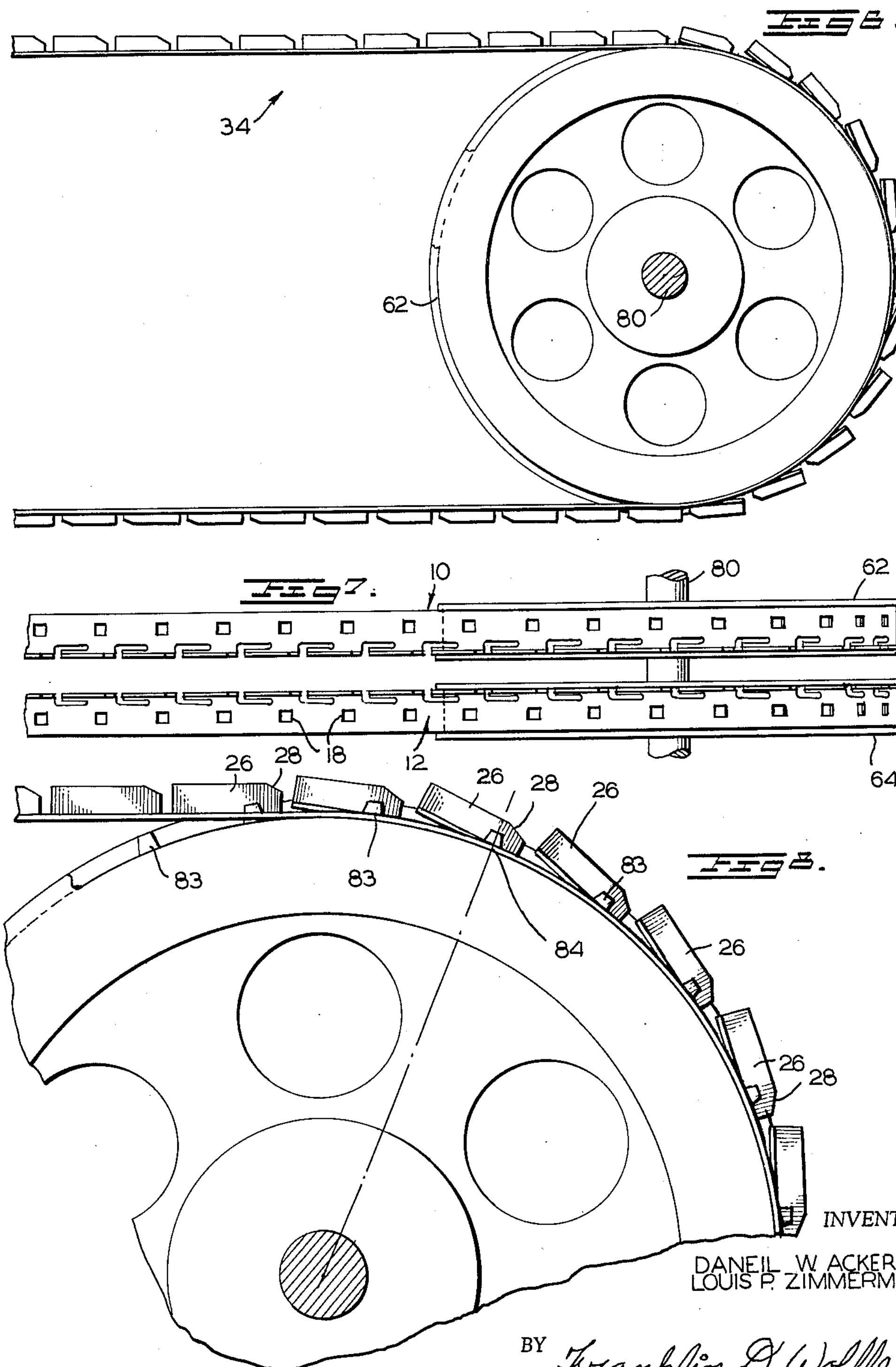
INVENTORS
DANEIL W. ACKERMAN
LOUIS P. ZIMMERMAN
BY Franklin D. Wolffe
ATTORNEY PROCESS LINE CONVEYOR BELT
Filed Aug. 7, 1962 5 Sheets-Sheet 5
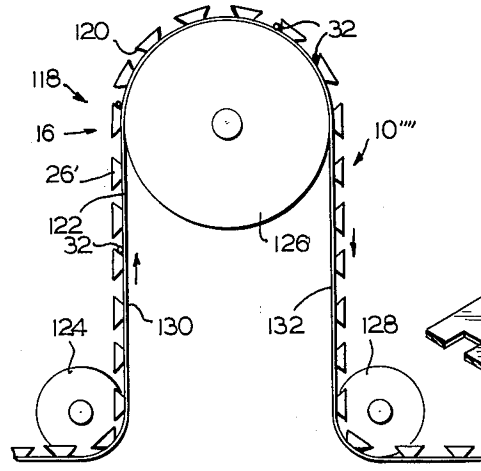
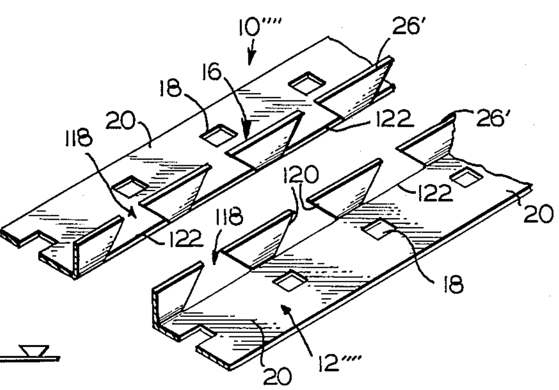
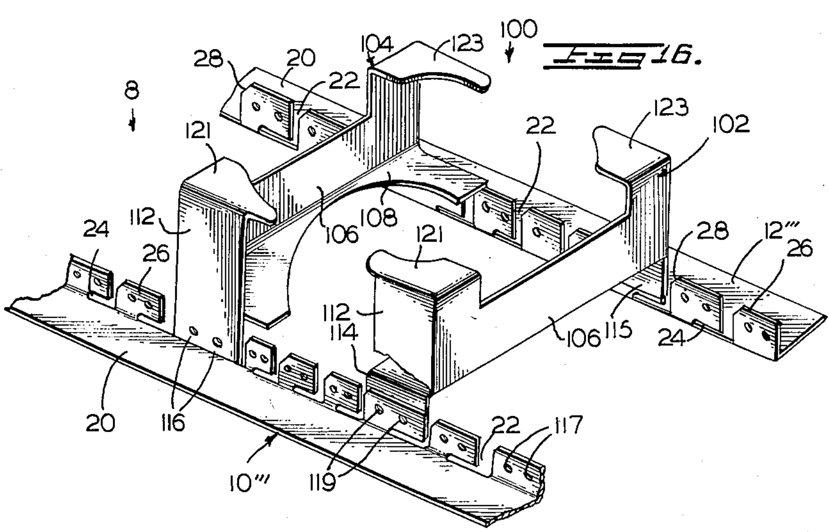
INVENTORS
DANIEL W. ACKERMAN
LOUIS P. ZIMMERMAN
BY Franklin D. Wolffe
ATTORNEY

United States Patent Office 3,138,239 Patented June 23, 1964

1

3,138,239
PROCESS LINE CONVEYOR BELT

Daniel W. Ackerman and Louis P. Zimmerman, Binghamton, N.Y., assignors to Universal Instruments Corporation, Binghamton, N.Y., a corporation of New York Filed Aug. 7, 1962, Ser. No. 215,407
19 Claims. (Cl. 198—131)

The present invention relates to a device for conveying articles, usually from one work station to another, and is particularly adapted to be incorporated in automatic machinery used in the fabrication of small electronic components with diametrically opposed protruding wires such as resistors, semi-conductor diodes, capacitors, etc.

Conveyors in use today are usually heavy cumbersome devices comprising a pair of chain runs carrying an article supporting means between opposing links on each pair of chains. These prior art devices are each made up of a driving means and an article supporting means. Generally, the driving means comprises a pair of heavy endless metal chains, each connected between a driving sprocket and an idler gear. The article supporting means is connected between the pair of chains so as to hold the individual articles being transported. Another method of conveying material is with a simple endless belt upon whose upper surface articles may be indiscriminately placed. Such belts have been provided with transverse flanges mounted thereon to insure that the articles are evenly carried along on the surface of the belt.

Although the types of conveyors described above have found wide acceptance in numerous fields, where either heavy objects or large bulk materials required conveyance, they are nevertheless limited in their application when utilized in the field at electronic component handling due to the requirements of uniform spacing and delicate handling required by such items.

Specifically, metal chains with the attendant article carrying means have several distinct disadvantages when applied to handling small articles. It is readily apparent that the weight of the pair of chains and the attached article supporting means necessitates a considerable mass. Of course, this problem is compounded when the articles must be transported over a long distance. Further, when a conveyor must stop at exact positions, e.g. when performing a manufacturing step on one component at a time, large chains, which have a great deal of inertia prevent the repetitive, near instantaneous, stopping and starting that is required. This situation is compounded by normal chain wear which necessitates continual adjustment of the chain and the timing between work stations.

The fact that a chain is made up of links and must pivot at each connecting point, necessitates some looseness or tolerance to allow for a relative rotary movement. Over large conveyors this looseness makes it impossible to achieve exact positioning of the transported articles while maintaining the flexibility in the chain. Also the pivot pins between links provide joints that must be lubricated constantly when the conveyor is used to carry articles through a corrosive bath or a plating tank to prevent the chain from becoming frozen and inoperative.

In the handling of electronic components, it is often convenient to use the conveyor as a grounding means, but the pivoted links of the chain provide an uncertain electrical connection, and therefore, it is not always advisable to test the components while they rest on the conveyor. Also any foreign matter accumulating around the pivot pins will act as insulators, causing a voltage drop across a joint or even a complete cessation of current. Even the very looseness of fit needed to allow a chain to perform its functions will cause such a voltage drop. It is, therefore, imperative that a chain, being used as a ground in an electrical circuit, be periodically dismantled and cleaned to insure against malfunction resulting in lost man-hours and production.

2

During the production of electronic components it is often necessary to route them through ovens or kilns during their manufacture. The known chain conveyors, because of their mass, will usually act as large heat sinks, their links, pivot pins, article carrying means, etc. providing an extensive area for rapidly absorbing heat. This greatly raises the energy input necessary in small drying ovens or kilns and furthermore sometimes necessitates the use of outside cooling means to prevent heat build-up in the general area of the usually delicate component handling machinery.

From the foregoing it would seem preferable to be able to use a single light flexible fabric belt as a conveyor since it is much cheaper and lighter than a chain arrangement. However, a belt has its attendant problems, not the least of which is that its very configuration prevents an article from being acted upon at a work station from any but an overhead position. This is especially noticeable when the component is passed through drying ovens, spraying sheds, or plating baths. Another problem encountered is the difficulty in connecting article carrying means to the belt at exact positions and finding a flexible belt that will take the temperature ranges and corrosive conditions to which the conveyor will be subjected. In the usual flexible conveyor the articles carrying means are generally bonded to the belt by adhesives, rivets, etc., providing a junction point which is under continual shearing stresses resulting in rapid fatigue failure.

As previously mentioned, a single belt conveyor does not allow the article to be acted upon from all directions. A pair of belts with an article carrying means connected between them would allow the components to be acted on from diverse directions, but with the attendant problems of keeping both belts in exactly the same position with respect to each other at all times. This problem in synchronization could be solved by forming adjacent apertures in each pair of belts and having these belts driven by gears meshing with the apertures. This has proved unsatisfactory since the belts tend to flex at the point of least cross-sectional area, in this case, at the apertured section, with the bending stresses soon causing fatigue failure and short life. A belt material flexible enough not to show this fatigue failure would not be rigid enough to hold the article supporting structures in position within close tolerances.

Therefore, it is a general object of the present invention to provide a conveyor that will meet all of the above desideratum.

A more specific object of the present invention is the provision of an inexpensive conveyor and drive means for transporting small articles.

Another object of the present invention is to provide a light-weight conveyor for small electronic components or other articles.

A further object of the present invention is to provide a conveyor for small articles comprising one-piece flexible runs that include the article carrying means.

A still further object of the present invention is to provide an inexpensive light-weight article conveyor which will resist harsh environmental conditions found in electronic component handling.

Other objects and the nature and advantages of the present invention will be apparent from the following description taken in conjunction with the accompanying drawings, wherein:

FIGURE 1 is an illustrative view of a first embodiment of the invention, showing a pair of conveyor runs being used to transport an electronic component;

FIGURE 2 is a sectional view of the invention through line 2—2 of FIGURE 1 showing the cross-sectional area of the conveyor at a point where the conveyor belts are apertured;

FIGURE 3 is a sectional view across line 3—3 of FIGURE 1, showing the cross-sectional area of the conveyor runs;

FIGURE 4 is a side view of a portion of an electronic component handling machine including the conveyor of the instant invention as used for transporting the components from a wire straightening and taping machine, through a drying oven;

FIGURE 5 is a sectional view through line 5—5 of FIGURE 4, showing the conveyor runs and the guide means therefor;

FIGURE 6 is a side view of a portion of the conveyor of FIGURES 4 and 5, particularly illustrating the configuration of the conveyor as it bends around a gear;

FIGURE 7 is a top plan view of the conveyor shown in FIGURE 6 showing both conveyor runs entrained around their respective idler gears;

FIGURE 8 is a developmental side view of the conveyor belt of FIGURE 6 showing the attitudes taken by the vertical sections of one of the conveyor runs during the portion of the circuit in which the run bends around the circumference of a gear;

FIGURE 9 is a top plan view of a second species of the conveyor belt;

FIGURE 10 is a side view of the species of FIGURE 9;

FIGURE 11 is a top plan view of a third species of the instant invention;

FIGURE 12 is an illustrative view of a fourth species of the instant invention;

FIGURE 13 is a side view of a portion of fifth species of the instant invention designed to carry articles in a vertical direction;

FIGURE 14 is an illustrative view of the species of FIGURE 13;

FIGURE 15 is an illustrative view of the species of FIGURES 9 and 10, showing the conveyor runs adapted to rotatably support auxiliary carrying means; and FIGURE 16 is an illustrative view of the species of FIGURE 12 showing the conveyor runs adapted to carry rigid auxiliary carrying means.

Referring first to FIGURES 1–3 of the drawings, conveyor means generally indicated at 8 comprising a pair of runs generally indicated by the reference numerals 10 and 12, transporting an electrical resistor generally indicated at 14 between them, are formed as belts of flexible material with one side thereof bent up into a vertical plane to form a flange generally designated 16, each flange being formed on the side of its respective belt that lies adjacent the other belt of the pair. Since the runs are mirror images of each other, only the details of the upper run 10 of FIGURE 1 will be described. It will be understood that the opposite run 12 will have like reference numerals. Run 10 is formed with a series of gear meshing apertures 18 spaced along its flexible belt surface 20. Between each adjacent pair of gear meshing apertures 18, the vertical flange 16 has an article carrying slot 22 formed therein and extending a short distance transversely across the belt surface 20. The article carrying slot 22 is formed nearer one of the adjacent gear meshing apertures 18 and has a stress relieving extension 24 extending in one direction from the article carrying slot in the horizontal belt surface 20 parallel to the belt edge. This extension is so positioned that each end is equidistant from its nearest gear meshing aperture 18, the composite slot in the horizontal plane forming an L. Each vertical flange section 26, bounded by the article carrying slots 22, has one of its vertical ends, delineated by slots 22, beveled as at 28 to provide an inclined surface which permits a lead 32 extending from the body 30 to roll easily into the slot 22 as the conveyor moves in the direction of the arrow.

The operation of these runs is illustrated by FIGURES 4 through 8 wherein a conveyor system 34 including the conveyor 8 of the present invention is disposed between a chute 36 at the base of a component straightening and testing machine (e.g. as disclosed in the application of Wilson et al., S.N. 72,305, filed Nov. 29, 1960) and a drying oven 38 from which the components emerge, still on the conveyor, as a finished product. The conveyor framework generally designated at 40 will support the drying oven 38 and the chute 36, from the component straightener and taper, and is itself supported by like pairs of legs 42 placed in a rectangular pattern. Furthermore, the conveyor framework 40 includes a pair of elongated support members generally indicated by numerals 42 and 44 each of which consists of a horizontal portion 46 and a depending vertical portion 48 (FIGURE 5). The vertical portions 48 are in face-to-face relationship, while the horizontal portions 46, are in the same plane and extend toward each other from the vertical portions. The open end of each horizontal portion is bent vertically upward, forming guiding flanges 50. Also conveyor guide strips 52 are mounted on the upper side of each horizontal portion 46, parallel to the guiding flanges 50, and extending the length of the support members 42 and 44. Grooves 54, formed by the spacing between the guiding flanges 50 and the guide strips 52 are just wide enough to accommodate the width of a run of the conveyor.

The elongated support members 42 and 44 are mounted far enough apart so that a resistor coming down the chute 36 will rest with its cylindrical body portion 30 between the flanges 50 with its axial extending leads 32 dropping into article carrying slots 22 in the vertical flanges 16 of the conveyor runs 10 and 12. Each of the two runs which make up the conveyor means 8 is mounted in its respective groove 54 on the elongated support members 42 and 44 between guide flanges 50 and guide strips 52 thereby preventing lateral movement of the runs 10 and 12. Each run extends continuously around a drive sprocket 56, rollers 58 and 60, idler gear 62 (Run 12) (64 for Run 10) and then back through support grooves 54 to a drive sprocket 56. The rollers 58 and 60 are mounted on frame extensions 66 and 68, respectively, and support the runs on the return flight of the conveyor between the sprockets and idler gears where it is not supported by the elongated members 42 and 44. The drive sprockets 56 are fixedly mounted on shaft 70 which is rotatably journalled in frame extension 72. Also fixedly mounted on the shaft 70 is pulley 74 which is in turn powered by electric motor 76 through belt 78. Similarly the idler gears 62 and 64 are fixedly mounted on rotatable shaft 80 journalled in frame extensions 82.

Referring now to FIGURES 6, 7 and 8, the conveyor system 34 of FIGURE 4 can be seen with the runs 10 and 12 entrained about idler gears 62 and 64 (FIG. 7) which are fixedly mounted on shaft 80. The idler gears are provided with teeth 83 equidistantly placed around the gear circumference the same distance apart as the apertures 18 of the runs 10 and 12. Each gear has a pair of continuous radial flanges 85 on its circumference with the gear teeth 83 being positioned between said pair of flanges. The spacing between the flanges 85 is just wide enough to restrain the appropriate conveyor run against lateral movement when the teeth 83 of idler gear 62 or 64 mesh with gear meshing apertures 18 in runs 10 or 12, respectively. Thus, holding the two runs so that a plane extending through opposite article carrying slots 22 will always be in parallel relationship with the axes of shafts 70 and 80.

In the detail view of FIGURE 8, the sections 26, bounded by adjacent article carrying slots 22, do not conform to the circumference of the idler gear upon which they are entrained, but rather, due to the stress relief slots 22, form a tangent to the base circle of the idler gear 62 at point 84 (approximately opposite the center of gear meshing apertures 18). The article carrying slot 22 and stress relieving extensions 24 provide a means for making a one-piece conveyor belt and article carrying means where the vertical slots are used to carry the transported articles along a conveyor track with the horizontal extension 24 providing the desired flexibility. If only the vertical slots were formed in the flange 16, the bending moment, where the run curves around its meshing gears, would be narrowly restricted to these slots and the material of which the run is composed would quickly deteriorate at these points. It has been found that by widening the area over which the bending moment occurs, from slightly more than a line to a comparatively large area, failures do not occur. Beyond merely elongating the bending moment over the length of a horizontal slot extension, this configuration prevents the belt from bending any appreciable amount at the aperture 18 where the belt is the narrowest and where fatigue failures would be the most prevalent.

The cross-sectional views of FIGURES 2 and 3 amplify the operation explained above. FIGURE 2 illustrates the narrow sections of material remaining in the conveyor belt sections 20 at the point adjacent to the apertures 18 where the run is held against bending while FIGURE 3 illustrates the larger cross-section of belt material in the conveyor belt section 20 across from the horizontal stress relieving slot extension 24 and where bending is allowed to occur.

FIGURES 9 and 10 show a second embodiment of the invention in which the vertical slots 22' in endless runs generally designated by 10' and 12' are equidistant from each pair of apertures 18 and the horizontal stress relieving extensions 86 extend in both directions from the end of the article carrying slots 22' parallel to the edges of the run, so that the composite slit forms a T in the horizontal plane. Stress relieving slot extensions 86, forming the head of the T, are equidistant from the adjacent gear meshing apertures 18. Thus modification would function the same as the first described embodiment with the exception that the point of tangency 84 of the base of each of the vertical flange sections 88 would be at the center of the section, bounded by each pair of article carrying slots 22' when the belt is entrained around the idler gear and drive sprocket.

FIGURE 11 shows another embodiment in which the number of article carrying slots 22 in endless runs, generally designated 10'' and 12'' is sufficiently great and they are spaced at such a relatively short distance apart to permit a sufficient amount of bending at each article carrying slot without utilizing stress relief slots. As in the other embodiments, the runs are here restrained from bending at the narrower cross-sectional areas of the gear meshing apertures by the vertical flange sections 90. As long as the article carrying slots 22 can be kept close together and the gear diameters are large, fatigue failure is minimized, but it has been observed that after long running times stress failures may occur. Such a conveyor would find its greatest value in miniaturized work where it might prove difficult to provide the extension slots 24 and 86 and where it might be more advantageous to utilize the entire width of the belt to maximize strength.

FIGURE 12 shows a further embodiment of the invention in which runs generally designated by 10''' and 12''' have no gear meshing apertures and are designed to be frictionally driven by pulleys rather than positively driven by gears. While the stress relieving slots of the embodiment shown in the previous figures could possibly be used here, for illustrative purposes, the slotting means of the first embodiment has been shown. In this embodiment the stress relieving extensions 24 provide the already mentioned function of preventing fatigue failure by broadening the area of bending.

FIGURES 13 and 14 illustrate another embodiment of the invention in which runs generally designated by 10'''' and 12'''' are designed to convey components vertically without allowing the component lead wires 32 to escape from the article carrying slots generally designated at 118. Each of these slots 118 are within the vertical flange 16 and are triangular in shape with the slot base 122 of the triangle lying adjacent the edge of the flexible belt portion 20.

The conveying sides 120 of the triangular slot 118 do not meet at the top of the flange 16, but have an imaginary apex a short distance above the flange 16 so that flange sections 26' do not abut when the belt portions flex inwardly, i.e. when entrained about gear 128. The slot bases 122 also provides the function of the stress relieving slots described in previous embodiments.

If the triangular slots 118 have narrow bases in respect to the distance between gear meshing apertures 18, stress relief slots in the belt portion as shown in FIGURES 1 and 9 may be added there supplementing one flexure across the length of the slot bases 122. The gear meshing apertures 18 in the belt portion 20 are spaced between the triangular slots 118 so that the belt portion 20 does not flex across the smaller cross-sectional areas opposite these gear meshing apertures 18.

The triangular slot configuration described above is particularly useful when it is desirable to have a pair of runs proceed in a vertical loop to conserve space as in a drying oven. This use is shown by the fragmentary view of FIGURE 13, where a loop is formed by two vertical flights 130 and 132 which are entrained about the vertically staggered rotatable gears 124, 126 and 128; under the lower gear 124, over the upper gear 126, and under the lower gear 128. As many vertical flights as necessary can be formed with the appropriate number and placement of gears.

FIGURE 15 shows the embodiment of FIGURE 10 modified to carry a small wire cage 96 having support wires 97 which pass through adjacent holes 98 in adjacent flange sections 26 of runs 10' and 12' and is advantageous when the element to be transported is not symmetrical, or is not conducive to being carried between a pair of slots. Furthermore, it can also be used where the conveyed article is to remain on the conveyor even during the lower return of the circuit.

FIGURE 16 shows the embodiment of FIGURE 12 modified to convey small fans (not shown) by means of a rigid support bracket, generally designated 100, carried between runs 10''' and 12''' of conveyor 8 and supported on flange sections 26 by rivets 116 or other fastening means through two or more holes 117 in each flange section 26 and adjacent matching holes 119 in the bracket 100. The rigid support bracket 100 is made up of opposing sections 102 and 104. Each support bracket section has a pair of vertical rectangular legs 114 and 115, each leg of the pair being adjacent and parallel to an opposing flange 26 of runs 10''' and 12'''. Lower horizontal spanning sections 108 connect the upper edges of the opposing legs 114 and 115 of each rigid support bracket section 102 and 104. The lower horizontal spanning sections 108 are contoured at their opposing edges to provide a support for the muffin fans being conveyed. A vertical spanning section 106 extends upwardly from the far edge of each of the lower spanning sections 108 and for the entire length thereof. One end of each of the vertical spanning sections, a vertical strengthening flange 112 extends perpendicular thereto and extends toward the opposing bracket section, overlapping the leg 114 and providing holes (not shown) lining up with holes 119 in legs 114 for fastening to a flange 26. Two upper article support sections 121 lie in a horizontal plane and extend along the upper edges of strengthening flanges 112 and a short distance along the vertical spanning sections 106 from said strengthening flanges, extending over the respective lower horizontal spanning section 108. Two upper article support sections 123 extend from the far upper ends of vertical spanning sections 106 toward each other and in the same horizontal plane as upper article support sections 121. The four upper article support sections 123 are contoured at their opposing sides to provide an upper support for the muffin fans being conveyed. Although the rigid bracket arrangement such as described above could be used with any of the run embodiments shown, it is especially adaptable to the embodiment of FIGURE 12 wherein the bracket would prevent the runs from shifting out of line because of possible slippage in the friction drive.

This invention accordingly provides a new and improved conveyor belt which would cost a fraction of the price of a conventional chain and whose weight would also be greatly reduced; whose thermal mass would be low with respect to other conveyor systems; and whose one-piece construction would prevent cumulative tolerance error and would provide maintenance free operation under environmental conditions in which a chain could not be expected to survive. Conveyor runs of the present invention can be simply made in a repetitive punching operation by starting with a long strip of material in which the appropriate slots and apertures are formed, after which the strip is bent into an L shape, cut to any desired length, and welded together, while the only precaution that need be taken is to be sure the apertures on the opposite sides of the weld are spaced the same distance apart as the other apertures. The runs are preferably fabricated of a flexible metal strip such as copper, brass, bronze, etc., but may be made of a nonmetallic material such as rubber or one of the resilient modern plastics, e.g. polyethylene, polypropylene, the range of materials only being limited by the inherent ability of a particular material to hold its formed shape, especially in the environmental conditions to be found in a particular use.

Since many other embodiments of this invention may occur to those skilled in the art, it is to be understood that the embodiments of the present invention as shown and described are only illustrative of many possible embodiments and are not intended as a limitation of the scope of the invention.

What is claimed is:

1. In a conveyor for transporting articles; a pair of flexible one-piece runs, means for mounting said pair of runs in said conveyor in a spaced, parallel relationship and driving said runs in unison, each run including an endless driving surface, a flange depending therefrom and parallel to the edge of the run, article carrying means formed in said flange, whereby the article carrying means in said flange permits the endless driving surface to flex.

2. A conveyor for transporting articles comprising, in part; a pair of flexible one-piece runs, means for mounting said pair of runs in said conveyor in a spaced, parallel relationship and driving said runs in unison, each run including an endless driving surface, a flange depending from each of said endless driving surfaces and parallel to the edge of the run, slots in each of said flanges extending at least to the driving surface and perpendicular thereto, supporting means in each of said flanges between said slots and article carrying means held between opposing supporting means in the article conveyor runs.

3. The conveyor of claim 2, wherein the article supporting means consists of holes in said flanges, the article carrying means comprise a perforated enclosure rotatably suspended from and supported by at least one hole in each of said flanges.

4. The conveyor of claim 2 wherein the article carrying means comprises a bracket structure rigidly connected to at least one flange.

5. An article conveying means comprising, in combination; a pair of one-piece belts, means for driving said pair of belts in unison and in a substantial parallel and spaced relationship, each of said belts having a planar driving portion and an article conveying portion, said article conveying portion lying outside the plane of said driving portion, whereby the article conveying means of said pair of belts are retained in the same relative position in respect to each other during the conveying operation.

6. An article conveying means as recited in claim 5, wherein each of said belts is an endless band.

7. A one-piece belt for use in an article conveyor comprising; a substantially planar driving portion, an article conveying portion lying outside the plane of the driving portion, cutouts in said article conveying portion extending through said article conveying portion and into said driving portion, said cutouts each permitting flexing of said belt whereby the driving portion can flex without tearing or permanently deforming the article conveying portion.

8. A conveyor for transporting articles comprising, in part; a pair of endless runs, each of said runs consisting of a flexible belt of L shaped cross-section forming first and second legs; equispaced gear-meshing apertures in the first leg of each run, article carrying slots in the second leg of each run arranged between adjacent pairs of gear meshing apertures in the first leg of each run; a rigid frame; a pair of drive sprockets, a pair of idler gears, each of said drive sprockets and said idler gears having equispaced circumferential teeth, means for journalling said drive sprockets in said frame in spaced parallel planes, means for journalling one of the idler gears in the frame in the plane of each drive sprocket, means for rotating said drive sprockets in unison; each of said runs mounted between one of said driving sprockets and the idler gear journalled in the plane thereof, said apertures in each run meshing with the teeth of the associated drive sprocket and idler gear whereby the pair of runs are arranged parallel and are driven with the article carrying slots in the pair of runs remaining in the same relative positions.

9. A conveyor for transporting articles comprising, in part, a pair of drive sprockets, a pair of idler gears, means for journalling said drive sprockets in said conveyor in spaced parallel planes, means for journalling one of said idler gears in the conveyor in the plane of each drive sprocket, means for rotating said drive sprockets in unison; a pair of one-piece endless belt conveyor runs, each of said runs being entrained over one of said drive sprockets and the idler gear in the plane thereof, each of said runs consisting of a planar belt having means for drivingly cooperating with the respective drive sprocket and idler gear, and an integral article carrying means on each run outside the plane of the belt, a pair of spaced apart, parallel conveyor run support means fixed on said conveyor, each support means including a planar surface and a pair of spaced parallel guide surfaces extending from each of the planar surfaces and perpendicular thereto, a portion of each run being supported on one of said planar surfaces and held between the parallel extending guide surfaces so that the runs are spaced apart and parallel.

10. The article conveyor of claim 9, wherein there is a chute from a machine for straightening and orienting electronic components having cylindrical bodies with lead wires depending from both ends of said bodies at the axis thereof, said chute being mounted above one end of the conveyor, said chute opening into said conveyor, between said runs, whereby the electronic components fall out of said chute onto said conveyor and reside on said conveyor with the center cylindrical bodies between the runs and the depending leads of each component being in the opposing article carrying slots in the flanges of the pair of runs.

11. The conveyor of claim 9, wherein said article carrying means consist of slots in the depending flange perpendicular to the driving surface.

12. The conveyor of claim 9, wherein the article conveying means consists of slots in a flange extending from the driving means.

13. The conveyor of claim 11, wherein gear meshing apertures are formed in the driving surface, and an article carrying slot is positoned between each pair of adjacent gear meshing apertures.

14. The conveyor of claim 13, wherein said article carrying slots in the depending flange extend into the driving surface.

15. The conveyor of claim 13, wherein the article carrying slot is triangular in shape with the base of the triangle coincident with the base line of the flange and an imaginary apex above said flange.

16. The conveyor of claim 14, wherein stress relieving slots are positioned in the driving surface parallel to the edge of the run, each stress relieving slot being a continuation of the article carrying slot in the driving surface.

17. The conveyor of claim 16, wherein the stress relieving slots are positioned equi-distant from adjacent gear meshing apertures.

18. The conveyor of claim 16, wherein each stress relieving slot is connected at one end to the end of the article carrying slot formed in the driving surface whereby the composite slot in the driving surface forms an L shape.

19. The conveyor of claim 16, wherein each stress relieving slot is connected to the end of the article carrying slot formed in the driving surface, the connection bisecting the stress relieving slot whereby the composite slot in the driving surface forms a T shape.

References Cited in the file of this patent

UNITED STATES PATENTS

| | | |
|---|---|---|
| 1,879,952 | Rosen | Sept. 27, 1932 |
| 2,880,850 | Keathley | Apr. 7, 1959 |
| 3,048,268 | Rocchi | Aug. 7, 1962 |